(Model.)
L. ETIENNE.
PIPE COUPLING.
No. 372,790. Patented Nov. 8, 1887.
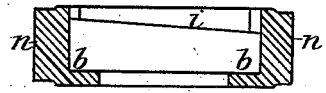
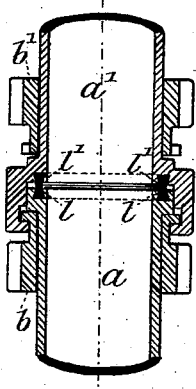
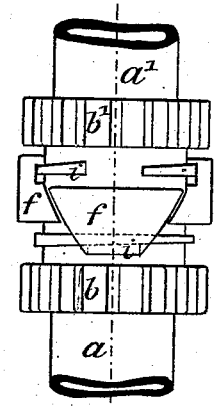
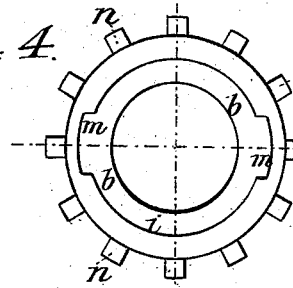
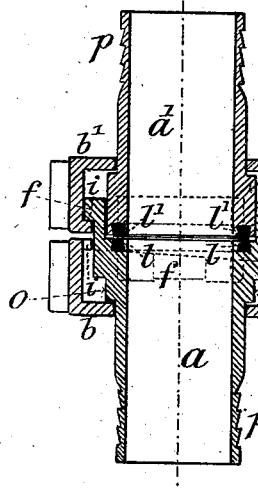
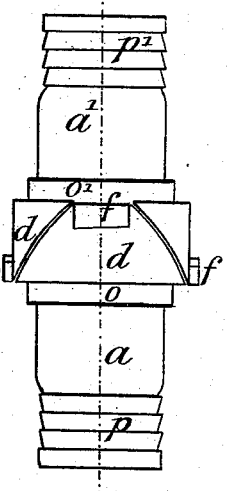
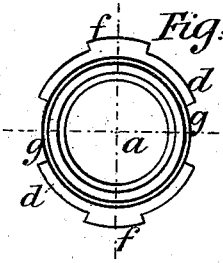
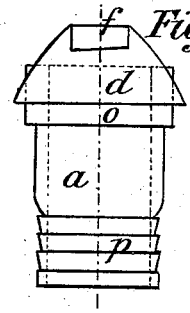
Witnesses.
Inventor.

UNITED STATES PATENT OFFICE.

LOUIS ETIENNE, OF PARIS, FRANCE.

PIPE-COUPLING.

SPECIFICATION forming part of Letters Patent No. 372,790, dated November 8, 1887.

Application filed April 5, 1886. Serial No. 197,776. (Model.) Patented in France July 17, 1885, No. 170,160.

*To all whom it may concern:*

Be it known that I, LOUIS ETIENNE, a citizen of the French Republic, residing at 99 Avenue Parmentier, Paris, France, have invented new and useful Improvements in Pipe-Couplings, (for which I have obtained a patent in France bearing date July 17, 1885, No. 170,160,) of which the following is a specification.

My invention relates to couplings for pipes; and it consists, mainly, in the arrangement of certain segmental cylindrical parts, hereinafter described, whereby two portions of the coupling are enabled to be inserted one into the other, although absolutely similar as to their form and equal as to their dimensions. This species of hermaphrodite coupling, which is well adapted for pipes or conduits containing fluids under pressure, can be connected and disconnected with the utmost rapidity and ease. It admits of being readily tightened by hand with great force, and combines all the conditions necessary for strength and durability of the parts being threaded or screwed together.

In the accompanying drawings, Figure 1 represents a section taken through the axis of a coupling constructed according to this invention, and Fig. 2 shows the coupling in elevation without the clamping-rings. Fig. 3 represents a side elevation, and Fig. $3^\times$ an end elevation, of one of the parts of the coupling which are attached to the pipes to be connected; and Fig. 4 is an end elevation, and Fig. $4^\times$ a longitudinal section, of one of the clamping-rings. Fig. 5 is a longitudinal section, and Fig. $5^\times$ a plan, of a modified form of the improved coupling, as hereinafter explained.

The ends of the pipes or tubing to be connected are attached to the coupling at $p$ to two parts, $a\ a'$, one of which is shown separately in Fig. 3. These parts $a\ a'$ are provided with shoulders $o\ o'$, which afford bearings for corresponding internal flanges on clamping-rings $b\ b'$. As shown more clearly in Figs. 3 and $3^\times$, each junction is constituted by four parts. Each of the two parts $a\ a'$ is provided with two projections, $d$, and with two recesses, $g\ g'$, for the reception of the two projections on the other part. The projections and recesses are all identical in form, and present inclined sides, so that they may be readily slipped into position and caused to engage one with the other, the projection $d$ on the one part entering the recess $g'$ of the other part, and vice versa, as indicated in Fig. 2.

Each projection $d\ d'$ is provided with a claw or shoulder, $f$ or $f'$, the back or bearing surfaces of which are slightly inclined to the axis of the coupling. The clamping-rings $b\ b'$ are provided internally with flanges or shoulders $i\ i$, the bearing-surfaces of which are likewise inclined to correspond with the inclines on the claws or shoulders $f\ f'$ on the parts $a\ a'$, so that when these two parts are put together, with the projections on the one engaging with the recesses on the other, and the clamping-rings are slipped over the claws on each projection, (the internal flanges on the rings being cut away at $m$ in order to provide a passage for the claws,) the parts of the coupling may be forcibly wedged together by turning the rings in opposite directions. Rubber or other suitable packing, $l\ l'$, is interposed between the abutting surfaces of the coupling, in order to obtain a tight joint capable of supporting considerable pressure without leakage.

The clamping-rings $b\ b'$ are provided with teeth or projections $n\ n$, enabling them to be turned by means of a key or suitable instrument and affording a better holdfast for turning by hand.

A modified arrangement of my invention is illustrated in Figs. 5 and $5^\times$, in which rings are provided with external shoulders or projections, and the claws are turned inward so as to engage therewith, the action being precisely the same as in the arrangement hereinbefore described. By means of this arrangement the diameter of the coupling is reduced.

It is evident that I do not limit myself to the precise arrangements hereinbefore described, and that the number and shape of the shoulders $d$ and of the claws $f$ may be modified without affecting the principle of the invention. In like manner any suitable metal may be employed in the construction of the coupling.

I am aware that in couplings heretofore made there have been projections upon the tubular portion of one coupling passing between similar projections upon the tubular portion of the other coupling; but, in consequence of the edges of these projections being parallel, difficulty is experienced in connecting the one with the other. This is avoided in my improvement by making the edges of the interlocking projections tapering; and in my improvements the locking-rings having the inclines rest against shoulders and are free to be revolved entirely around the tube of the coupling, instead of being limited by a pin within a sectional groove, and in my improvement the coupling can be held together by one ring, the other ring not necessarily being turned.

Having described my invention, what I claim, and desire to secure by Letters Patent, is—

1. In a coupling for the ends of pipes, two tubular couplings with an intervening packing and having peripheral shoulders, and each tube having projections with inclined or tapering edges that lap upon the sides of the contiguous tube, and claws or lugs upon the projections, in combination with separate rings, each having a circular flange bearing against the shoulders upon the couplings, and having inclines to act upon the claws or lugs upon the projecting and lapping ends to draw the coupling together, substantially as specified.

2. The short lengths of pipe $a\ a'$, having peripheral shoulders at $o'$, and projecting and lapping ends $d$, having inclined edges and external claws or lugs $f$, in combination with the packing-rings, the rings $b\ b'$, having flanges to bear against the shoulders $o'$, and inclines to act upon the claws or lugs in drawing the coupling together, said rings having recesses or slots through their inclines for the passage of the lugs $f$, and having exterior serrations or projections, by which they are revolved, substantially as specified.

In testimony whereof I have signed this specification in the presence of two subscribing witnesses.

LOUIS ETIENNE.

Witnesses:
   JULES FAYOLLET,
   AUG. VINCK.